(12) United States Patent
Shveidel

(10) Patent No.: US 10,740,158 B2
(45) Date of Patent: Aug. 11, 2020

(54) SYNCHRONIZATION OBJECT ABORTING SYSTEMS AND METHODS

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 252 days.

(21) Appl. No.: 15/969,010

(22) Filed: May 2, 2018

(65) Prior Publication Data
US 2019/0340039 A1 Nov. 7, 2019

(51) Int. Cl.
*G06F 9/52* (2006.01)
*G06F 9/48* (2006.01)
*G06F 9/50* (2006.01)
*G06F 16/176* (2019.01)

(52) U.S. Cl.
CPC .............. *G06F 9/52* (2013.01); *G06F 9/4881* (2013.01); *G06F 9/50* (2013.01); *G06F 16/176* (2019.01); *G06F 16/1767* (2019.01); *G06F 16/1774* (2019.01); *G06F 9/524* (2013.01)

(58) Field of Classification Search
None
See application file for complete search history.

(56) References Cited

U.S. PATENT DOCUMENTS

| 5,809,224 A * | 9/1998 | Schultz ................. G06F 3/0626 |
| | | 714/6.32 |
| 2012/0192194 A1* | 7/2012 | Richardson ............. G06F 9/526 |
| | | 718/103 |
| 2015/0317191 A1* | 11/2015 | Shen ....................... G06F 11/34 |
| | | 710/200 |

* cited by examiner

*Primary Examiner* — Qing Yuan Wu
(74) *Attorney, Agent, or Firm* — Daly, Crowley Mofford & Durkee, LLP

(57) ABSTRACT

A system for controlling a synchronization object of a computer processing system. The system includes one or more processors programmed and configured to cause the execution of one or more processing threads, a background thread configured to manage the processing flow of the one or more processing threads, the background thread configured to process one or more predetermined abort points for the one or more processing threads, the one or more abort points configured to direct a processing thread to execute exit processing code when an abort indicator signals that the processing threads should be aborted. The system further includes a synchronization object for synchronizing the processing of one or more processing threads, the synchronization object comprising a waiting queue for processing requests made by the one or more processing threads. The synchronization object is programmed and configured to, upon receiving a processing request from a processing thread, queue the processing thread in the waiting queue until the processing request can be processed, wherein the synchronization object releases processing threads in the waiting queue in response to a request that the processing threads should be aborted.

20 Claims, 5 Drawing Sheets

SYNCHRONIZATION OBJECT ABORTING SYSTEMS AND METHODS

BACKGROUND

Many types of computer-based resources, including shared resources, are utilized with synchronization processes to ensure proper and efficient use of those resources. Such resources include, for example, storage devices and clusters, databases, and computer processors. Synchronization may need to occur, for example, when one or more processing threads concurrently need use of those resources. Often when multiple threads need use of a single resource or a resource that requires atomic access (e.g., a memory object) a synchronization object (e.g., a semaphore object) may be employed to manage use of the resource between the threads. Other resources can include, for example, linked lists, queues, or storage offsets (e.g., that require access serialization). For example, the synchronization object may place some threads in a waiting queue while allowing another thread to utilize the resource.

One aspect of implementing such resources may be handling instances of resources that become unavailable. For example, a storage cluster may reach or be close to exceeding capacity and threads utilizing the resources may need to obtain resources elsewhere or end processing. If the process is currently in a synchronization object queue waiting for a resource, the synchronization object may be set up to perform a function to release waiting processes and allow them to seek resources elsewhere or end.

However, some process(es) may be processing a request for obtaining a lock on a resource before waiting processes are released. In that case, the process may request the resource from the synchronization object after the function to release waiting processes is already performed and the process may subsequently be put in a queue to wait for an unavailable resource. This may cause a "timeout" or other detrimental conditions to occur that negatively impact proper and efficient processing.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Aspects of embodiments are directed to systems and methods for synchronizing the use of computer-based resources including data storage resources.

An aspect of embodiments provides a system for controlling a synchronization object of a computer processing system including one or more processors programmed and configured to cause the execution of one or more processing threads, a background thread configured to manage the processing flow of the one or more processing threads, the background thread configured to process one or more predetermined abort points for the one or more processing threads, the one or more abort points configured to direct a processing thread to execute exit processing code when an abort indicator signals that the processing threads should be aborted. The system further includes a synchronization object for synchronizing the processing of one or more processing threads, the synchronization object comprising a waiting queue for processing requests made by the one or more processing threads, the synchronization object programmed and configured to, upon receiving a processing request from a processing thread, queue the processing thread in the waiting queue until the processing request can be processed, wherein the synchronization object releases processing threads in the waiting queue in response to a request that the processing threads should be aborted.

In an embodiment, releasing processing threads includes calling a cancel waiting function that releases processing threads in the waiting queue, wherein the cancel waiting function returns a signal indicating that the processing request made by the one or more processing threads in the waiting queue to the synchronization object was aborted.

In an embodiment, the synchronization object is further configured to, upon receiving any subsequent processing requests from processing threads, returning a signal indicating the request was aborted and not processed. In an embodiment, the synchronization object comprises an API, the API comprising at least one function for processing threads to make processing requests of the synchronization object, the at least one function configured to, while the abort indicator is not signaled, not returning until the processing request is processed or the cancel waiting function is processed and, if the abort indicator is signaled, returning a signal indicating the request was aborted without processing the request.

In an embodiment, if the synchronization object is busy processing requests, the process queus additional requesting processing threads in the waiting queue until the synchronization object is available to process the additional requests or until the cancel waiting function is called.

In an embodiment, the synchronization object is a semaphore object representing a system resource. In an embodiment, the system resource is a memory object. In an embodiment, the system resource is at least one of a volatile memory, non-volatile memory, or a memory pool.

In an aspect of embodiments, a method for controlling a synchronization object of a computer processing system includes executing one or more processing threads, executing a background thread configured to manage the processing flow of the one or more processing threads, the background thread configured to process one or more predetermined abort points for the one or more processing threads, the one or more abort points configured to direct a processing thread to execute exit processing code when an abort indicator signals that the processing threads should be aborted, executing a synchronization object for synchronizing the processing of one or more processing threads, the synchronization object comprising a waiting queue for processing requests made by the one or more processing threads.

In an embodiment, the synchronization object is programmed and configured to, upon receiving a processing request from a processing thread, queue the processing thread in the waiting queue until the processing request can be processed, wherein the synchronization object releases processing threads in the waiting queue in response to a request that the processing threads should be aborted.

In an embodiment, releasing processing threads includes calling a cancel waiting function that releases processing threads in the waiting queue, wherein the cancel waiting function returns a signal indicating that the processing request made by the one or more processing threads in the waiting queue to the synchronization object was aborted.

In an embodiment, the synchronization object is further configured to, upon receiving any subsequent processing requests from processing threads, returning a signal indicating the request was aborted and not processed.

In an embodiment, the synchronization object comprises an API, the API comprising at least one function for processing threads to make processing requests of the synchronization object, the at least one function configured to, while the abort indicator is not signaled, not returning until the processing request is processed or the cancel waiting function is processed and, if the abort indicator is signaled, returning a signal indicating the request was aborted without processing the request.

In an embodiment, if the synchronization object is busy processing requests, queuing additional requesting processing threads in the waiting queue until the synchronization object is available to process the additional requests or until the cancel waiting function is called.

In an embodiment, the synchronization object is a semaphore object representing a system resource. In an embodiment, the system resource is at least one of volatile or non-volatile memory.

In an aspect of embodiments, a computer program product for sharing computing resources is provided, the computer program product including a non-transitory computer-readable storage medium encoded with computer-executable program code programmed to cause the execution across one or more processors of executing one or more processing threads, executing a background thread configured to manage the processing flow of the one or more processing threads, the background thread configured to process one or more predetermined abort points for the one or more processing threads, the one or more abort points configured to direct a processing thread to execute exit processing code when an abort indicator signals that the processing threads should be aborted, executing a synchronization object for synchronizing the processing of one or more processing threads, the synchronization object comprising a waiting queue for processing requests made by the one or more processing threads, the synchronization object programmed and configured to, upon receiving a processing request from a processing thread, queue the processing thread in the waiting queue until the processing request can be processed, wherein the synchronization object releases processing threads in the waiting queue in response to a request that the processing threads should be aborted.

In an embodiment of the computer program product, releasing processing threads includes calling a cancel waiting function that releases processing threads in the waiting queue, wherein the cancel waiting function returns a signal indicating that the processing request made by the one or more processing threads in the waiting queue to the synchronization object was aborted.

In an embodiment, the computer-executable program code is further programmed to cause the execution across one or more processors of the synchronization object, upon receiving any subsequent processing requests from processing threads, returning a signal indicating the request was aborted and not processed.

In an embodiment, the synchronization object comprises an API, the API comprising at least one function for processing threads to make processing requests of the synchronization object, the at least one function configured to, while the abort indicator is not signaled, not returning until the processing request is processed or the cancel waiting function is processed and, if the abort indicator is signaled, returning a signal indicating the request was aborted without processing the request.

BRIEF DESCRIPTION OF THE DRAWING FIGURES

Other aspects, features, and advantages of the claimed invention will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. Furthermore, the drawings are not necessarily to scale, emphasis instead being placed on the concepts disclosed herein.

DETAILED DESCRIPTION

Aspects of embodiments are directed to systems and methods for implementing synchronization objects, including abort procedures for synchronization objects. It will be further understood that various changes in the details, materials, and arrangements of the parts that have been described and illustrated herein might be made by those skilled in the art without departing from the scope of the following claims.

Figure 1:
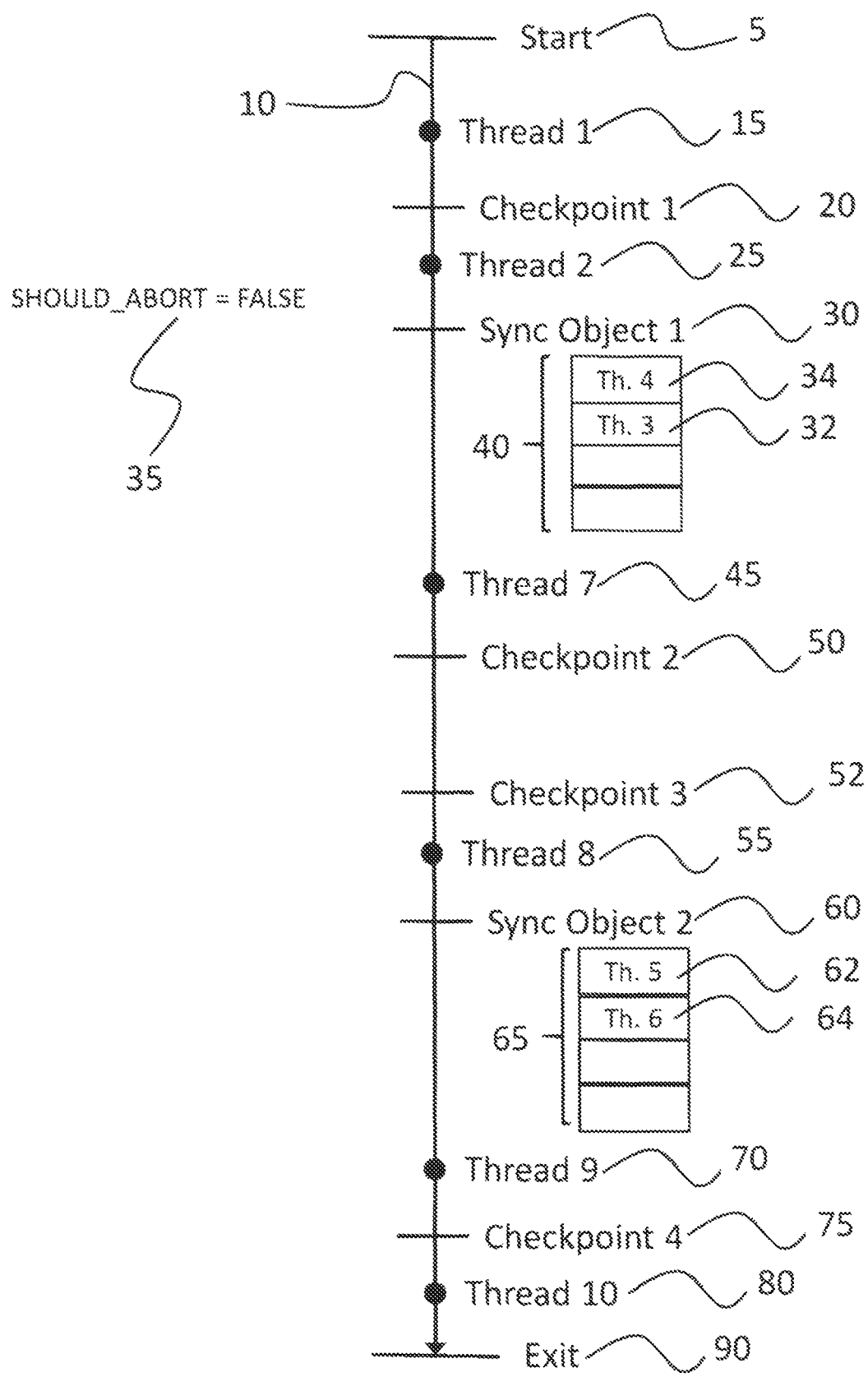
FIG. 1 is an illustrative flow diagram of a process utilizing multiple synchronization objects and multiple threads according to embodiments.

Referring to FIG. 1, an illustrative flow diagram of a process utilizing multiple synchronization objects and multiple threads is shown according to embodiments. A programmed flow 10 is programmed and configured to process multiple threads (e.g., background threads). Threads Thread 1 (15), Thread 2 (25), Thread 3 (32), Thread 4 (34), Thread 5 (62), Thread 6 (64), Thread 7 (45), Thread 8 (55), Thread 9 (70), and Thread 10 (80) are shown at a particular stage of the flow 10 at a point in time. In an embodiment, each thread began the flow 10 at a starting point 5.

The flow 10 includes the use of multiple synchronization objects (e.g., mutexes, semaphores) including Sync Object 1 (30) and Sync Object 2 (60) through which each thread will seek to obtain a lock on the respective synchronization object. If a thread is not able to obtain an immediate lock on the synchronization object, the thread will be queued in respective waiting queues (i.e., waiting queues 40 and 65) until the lock is obtained or the thread is otherwise terminated. Threads 3 and 4 are shown waiting in queue 40 of Sync Object 1 (30) while threads 5 and 6 are shown waiting in queue 65 of Sync Object 2 (60).

The flow also includes multiple abort checkpoints including Checkpoint 1 (20), Checkpoint 2 (50), Checkpoint 3 (52), and Checkpoint 4 (75) at which points of their processing the threads check the status of an "abort" indicator, (e.g., a SHOULD_ABORT flag 35), to indicate whether operation of the flow of the respective thread should be aborted. In an embodiment, the SHOULD_ABORT flag 35 is set to "FALSE," (as opposed to "TRUE") to indicate that the respective process should not abort flow 10. Unless otherwise terminated, each thread will proceed to an exit point 90 after all of the processing of flow 10 has been completed.

Figure 2:
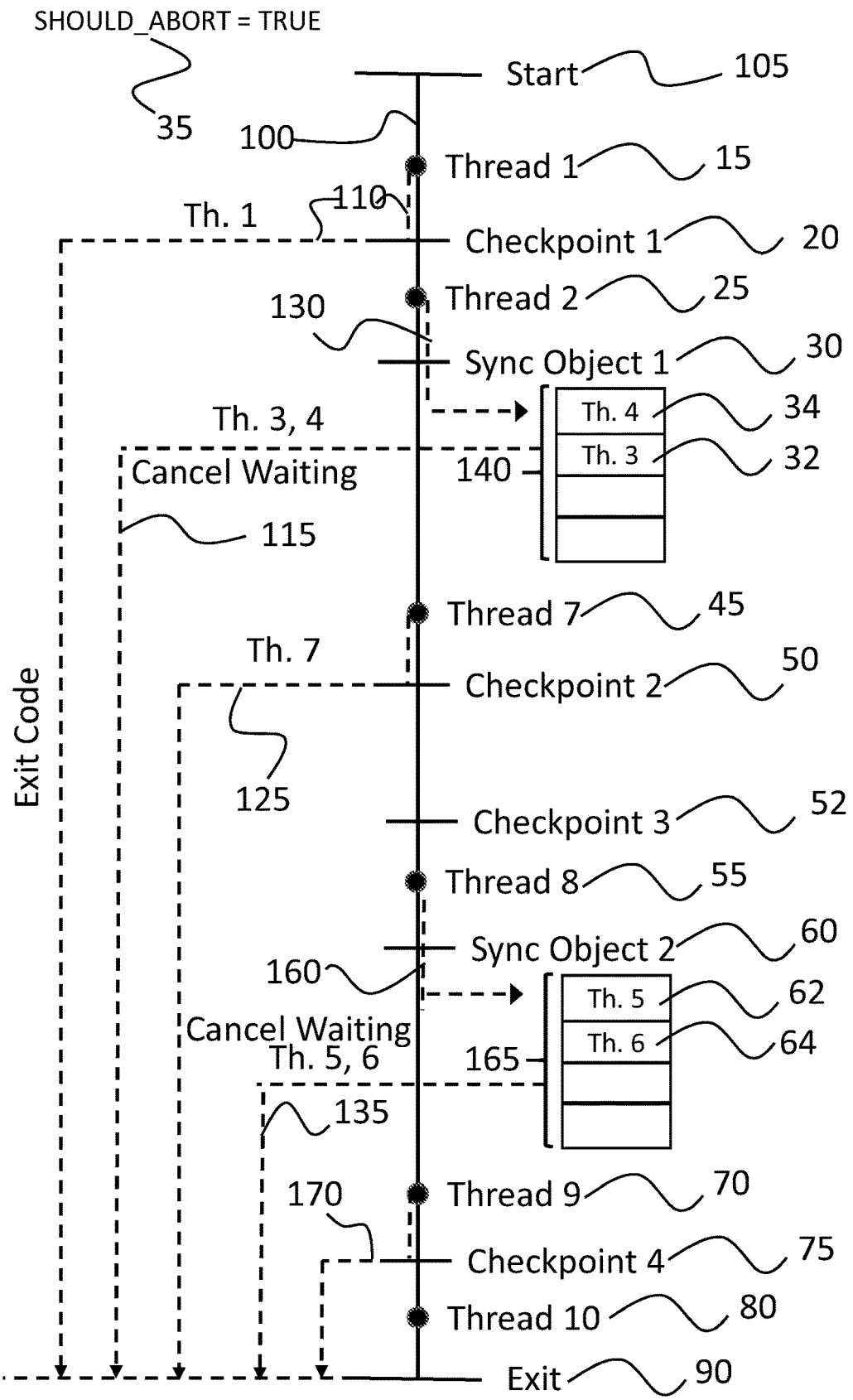
FIG. 2 is an illustrative flow diagram of a process utilizing multiple synchronization objects and multiple threads implementing an abort procedure.

FIG. 2 an illustrative flow diagram of a process utilizing multiple synchronization objects and multiple threads implementing an abort procedure according to embodiments. A process flow 100, beginning at start point 105, is programmed and configured to process the multiple threads referenced in FIG. 1. An abort procedure is activated which includes setting the abort indicator 35 (SHOULD_ABORT flag) to "TRUE," indicating that threads processing flow 100 should abort process flow 100. In an embodiment, Thread 1 (15) proceeds along a flow path 110 to Checkpoint 1 (20). At Checkpoint 1 (20), Thread 1 (15) processes a status check of the SHOULD_ABORT flag 35. In response to the SHOULD_ABORT being "TRUE," Thread 1 (15) aborts process flow 100 and instead processes exit code through process flow 110 prior to termination.

In the present embodiment, upon further processing of process flow 100, threads Thread 1 (15), Thread 7 (45), and Thread 9 (70) will reach checkpoints Checkpoint 1 (20), Checkpoint 2 (50), and Checkpoint 4 (75), respectively, and process exit code through process flows 110, 125, and 170, respectively. Thread 10 (80) will proceed along flow 100 until completion at end point 90.

In embodiments, process exit procedures (e.g., process flow 110) that branch from process flow 100 can include clean up code, for example, to save data from volatile memory to disk, terminate communication channels, notify a user of the abort procedure, and/or can include other abort procedures that would be known to one of ordinary skill in the art.

In an embodiment, when the abort procedure is started and the SHOULD_ABORT flag 35 is set to "TRUE," the abort procedure also causes Sync Object 1 (30) and Sync Object 2 (60) to release waiting threads in their respective queues 140 and 165 such as by performing a Cancel Waiting function as shown. Thread 3 (32) and Thread 4 (34) are released from queue 140 by the Cancel Waiting function and proceed to process exit code through process flow 115 while Thread 5 and Thread 6 are released from queue 165 by the Cancel Waiting function and proceed to process the exit code through process flow 135. Process flows 115 and 135 can include similar types of exit procedures as described above and/or can include specialized code for exiting from each of the respective queues 140 and 165.

In an embodiment, at the time the SHOULD_ABORT flag 35 is set to "TRUE," Thread 2 (25) and Thread 8 (55) are at processing points in a processing section between an abort checkpoint and a request for a synchronization object as shown, the span of which does not include any other abort checkpoints. Thread 2 (25) will proceed along process flow path 130 during which Sync Object 1 (30) is requested and Thread 8 will proceed along flow path 160 during which Sync Object 2 (60) is requested, each of the requests for the Sync Objects 1 and 2 occurring after the Cancel Waiting function had already been called and had released the threads waiting in their queues. Thread 2 (25) and Thread 8 (55) will subsequently then be placed in respective waiting queues 140 and 165 until they timeout or are otherwise terminated.

Figure 3:
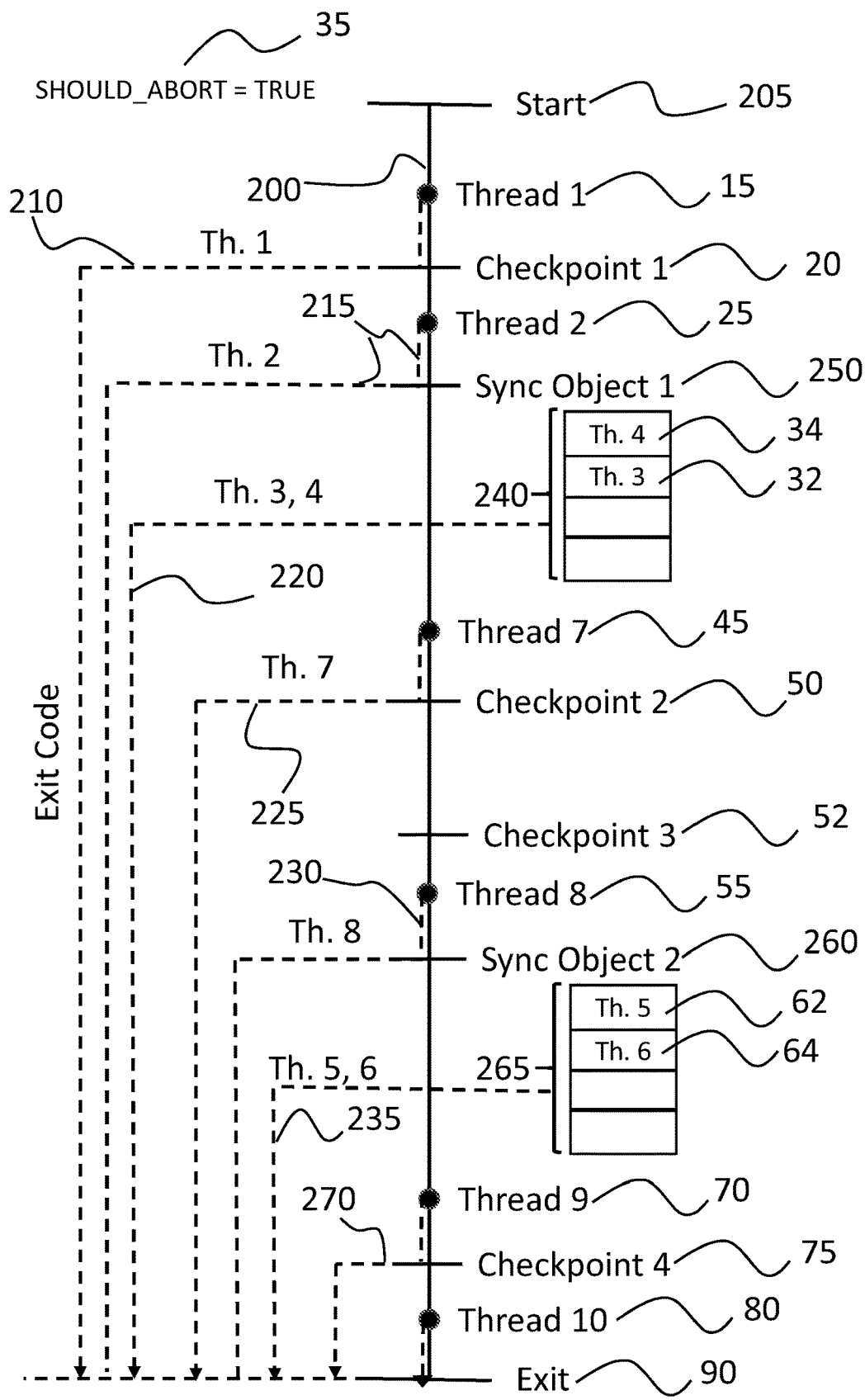
FIG. 3 is an illustrative flow diagram of a process utilizing multiple synchronization objects and multiple threads implementing an abort procedure according to embodiments.

Referring to FIG. 3, an illustrative flow diagram of a process utilizing multiple synchronization objects and multiple threads implementing an abort procedure is shown according to embodiments during which threads requesting synchronization objects are immediately returned/rejected without processing or being placed in waiting queues. A process flow 200, which begins at start point 205, is programmed and configured to process the multiple threads referenced in FIGS. 1 and 2 in which an abort procedure is called. The abort procedure causes abort indicator 35 (SHOULD_ABORT flag) is set to "TRUE" the Cancel Waiting function to release waiting threads from respective queues, and Sync Object 1 (250) and Sync Object 2 (260) are further configured to reject requests immediately from threads requesting the Sync Objects.

In the present embodiment, upon further processing of process flow 200, threads Thread 1 (15), Thread 7 (45), and Thread 9 (70) will reach checkpoints Checkpoint 1 (20), Checkpoint 2 (50), and Checkpoint 4 (75), respectively, and process exit code through process flows 210, 225, and 270, respectively. Thread 10 (80) will proceed along flow 200 until completion at an end point 90.

Thread 3 (32) and Thread 4 (34) are released from queue 240 to process exit code from the Cancel Waiting function through process flow 220 while Thread 5 and Thread 6 are released from queue 265 to process the exit code of the Cancel Waiting function through process flow 235. The Cancel Waiting function process flows 215 and 235 can include similar types of exit procedures as described above and/or can include specialized code for exiting from each of the respective queues 240 and 265.

In an embodiment, at the time the SHOULD_ABORT flag 35 is set to "TRUE," Thread 2 (25) and Thread 8 (55) are at processing points in a processing section between an abort checkpoint and a request for a synchronization object as shown, the span of which does not include any other abort checkpoints. Thread 2 (25) will proceed along process flow path 230 during which Sync Object 1 (250) is requested and Thread 8 will proceed along flow path 230 during which Sync Object 2 (260) is requested.

Instead of being placed in waiting queues after the Cancel Waiting function has already been called, such as described with respect to the embodiment of FIG. 2, the requests from Thread 2 (25) and Thread 8 (55) (e.g., function calls requesting the synchronization objects) are immediately rejected and will return without allocating use of the synchronization objects and without placing the threads in respective waiting queues 240 and 265, thus avoiding thread consuming timeouts or other synchronization complications during an abort procedure. In an embodiment, the requesting threads are notified (e.g., by returning a value from the function that called for the synchronization object) that the synchronization objects were not allocated. Thread 2 (25) and Thread 8 (55) subsequently process exit code along process flows 215 and 230, respectively, without further processing through process flow 200.

Figure 4:
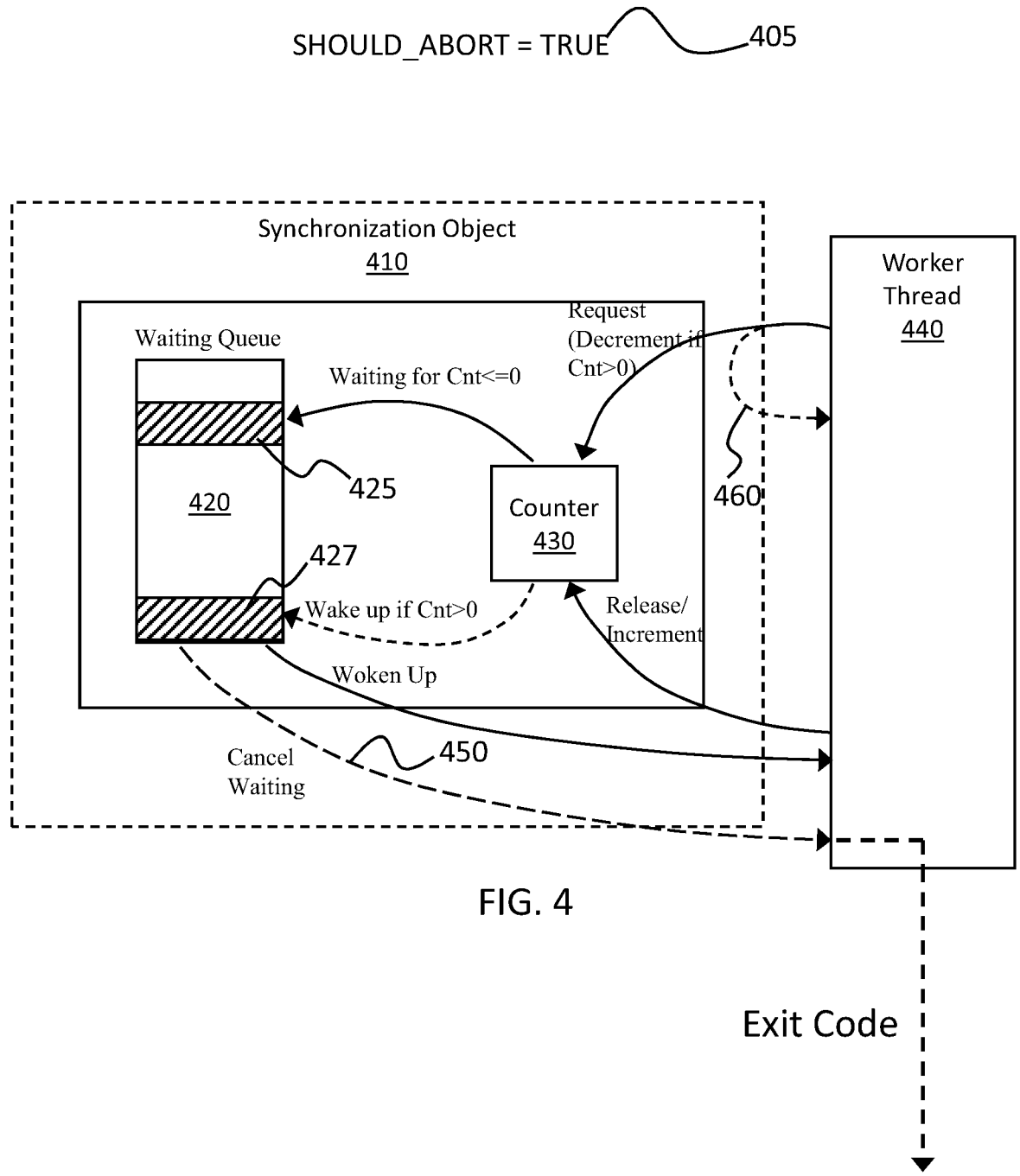
FIG. 4 is an illustrative block diagram of a synchronization object implementing an abort procedure according to embodiments.

Referring to FIG. 4, an illustrative block diagram of an exemplary synchronization object is shown according to embodiments. In an embodiment, a synchronization object 410 is a semaphore that processes requests from worker threads (e.g., worker thread 440) for access to a resource (e.g., storage pages), which keeps count of available resources with a semaphore counter 430. When a resource is available to the worker thread 440, the counter 430 is decremented. If a resource is not available, the worker thread's request will be put in a semaphore queue 420 (e.g., at queue slot 427). Once a resource becomes available (as reflected by a semaphore counter that is greater than zero), the next waiting thread in line (if any) in the queue (e.g., at queue slot 227) will be "woken up" and the newly available resource(s) will be allocated to the thread. The semaphore 410 will correspondingly (depending on the number of resources allocated) decrement the semaphore counter 430.

Once the thread is finished utilizing the resource and releases it, the semaphore counter will be incremented accordingly.

In an embodiment, an abort flag 405 (SHOULD_ABORT) is set to "TRUE" to indicate to processing threads that their processing should be aborted. For example, the number of available storage pages in a storage resource (not shown) may be reaching capacity and further processing of requests for storing data in the pages is aborted. In accordance with embodiments, threads which are waiting for the semaphore 410 to write data are released by way of an exit function (e.g., a Cancel Waiting function as described above) and proceed by processing exit code through flow 450 without being allocated resources through the synchronization object 410. Further, any threads requesting access to the resource represented by semaphore 410 are immediately rejected without being allocated resources and immediately return through exit process 460, which can further return a code indicating the immediate rejection. This way, none of the threads will need to "time out" before further processing as a result of the resource being indefinitely unavailable (aborted) when requests are made to them. For example, the threads can now immediately request access to an alternative resource (e.g., another storage device) that is available.

In embodiments, other types of synchronization objects that can be implemented with the described features include, for example, barrier, mutex, and ReadWriteLock synchronization objects.

Figure 5:
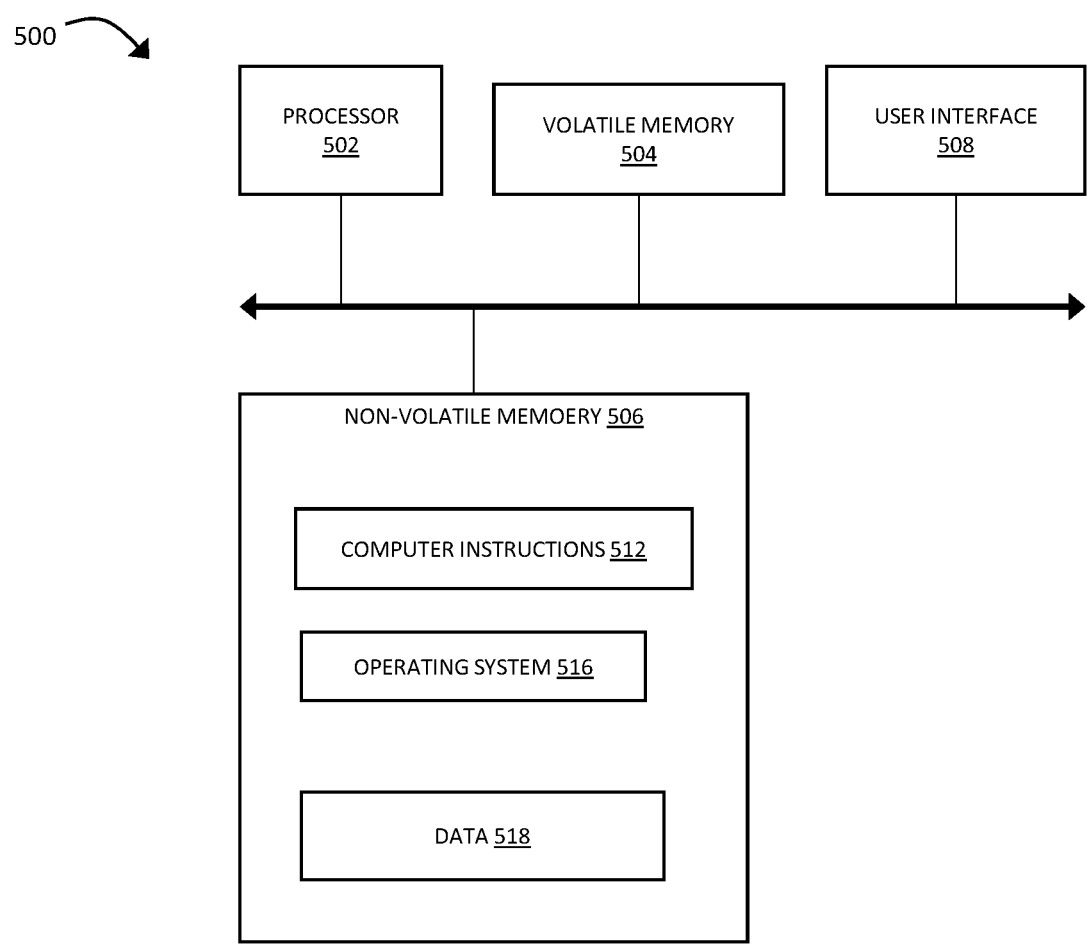
FIG. 5 is an illustrative block diagram of a computer system/processor for programming, configuring, and implementing various components of synchronization processing system according to embodiments.

Referring to FIG. 5, an illustrative block diagram of an embodiment is provided of a computer system/controller 500 used with various devices of the synchronization object processing system in accordance with embodiments (e.g., such as the processing threads and synchronization objects of FIGS. 1-4). A computer system 500 includes a processor 502, a volatile memory 504, a non-volatile memory 506 (e.g., hard disk) and a user interface (UI) 508 (e.g., a graphical user interface, a mouse, a keyboard, a display, touch screen and so forth). The non-volatile memory 506 stores computer instructions 512, an operating system 516 and data 518. In one example, the computer instructions 512 are executed by the processor 502 out of volatile memory 504 to perform all or part of the processes described herein (e.g., processes illustrated and described in reference to FIGS. 1 through 4).

These processes are not limited to use with particular hardware and software; they may find applicability in any computing or processing environment and with any type of machine or set of machines that is capable of running a computer program. The processes described herein may be implemented in hardware, software, or a combination of the two. The processes described herein may be implemented in computer programs executed on programmable computers/machines that each includes a processor, a non-transitory machine-readable medium or other article of manufacture that is readable by the processor (including volatile and non-volatile memory and/or storage elements), at least one input device, and one or more output devices. In embodiments, the processor can include ASIC, FPGA, and/or other types of circuits. Program code may be applied to data entered using an input device to perform any of the processes described herein and to generate output information.

The system may be implemented, at least in part, via a computer program product, (e.g., in a non-transitory machine-readable storage medium such as, for example, a non-transitory computer-readable medium), for execution by, or to control the operation of, data processing apparatus (e.g., a programmable processor, a computer, or multiple computers)). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a non-transitory machine-readable medium that is readable by a general or special purpose programmable computer for configuring and operating the computer when the non-transitory machine-readable medium is read by the computer to perform the processes described herein. For example, the processes described herein may also be implemented as a non-transitory machine-readable storage medium, configured with a computer program, where upon execution, instructions in the computer program cause the computer to operate in accordance with the processes. A non-transitory machine-readable medium may include but is not limited to a hard drive, compact disc, flash memory, non-volatile memory, volatile memory, magnetic diskette and so forth but does not include a transitory signal per se.

The processes described herein are not limited to the specific examples described. For example, the processes of FIGS. 1 through 4 are not limited to the specific processing order illustrated. Rather, any of the processing blocks of the Figures may be re-ordered, combined or removed, performed in parallel or in serial, as necessary, to achieve the results set forth above.

The processing blocks associated with implementing the system may be performed by one or more programmable processors executing one or more computer programs to perform the functions of the system. All or part of the system may be implemented as, special purpose logic circuitry (e.g., an FPGA (field-programmable gate array) and/or an ASIC (application-specific integrated circuit)). All or part of the system may be implemented using electronic hardware circuitry that include electronic devices such as, for example, at least one of a processor, a memory, a programmable logic device or a logic gate.

Elements of different embodiments described herein may be combined to form other embodiments not specifically set forth above. Other embodiments not specifically described herein are also within the scope of the following claims.

Reference herein to "one embodiment" or "an embodiment" means that a particular feature, structure, or characteristic described in connection with the embodiment can be included in at least one embodiment of the claimed subject matter. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the words "exemplary" and "illustrative" are used herein to mean serving as an example, instance, or illustration. Any aspect or design described herein as "exemplary" or "illustrative" is not necessarily to be construed as preferred or advantageous over other aspects or designs. Rather, use of the words "exemplary" and "illustrative" is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

To the extent directional terms are used in the specification and claims (e.g., upper, lower, parallel, perpendicular, etc.), these terms are merely intended to assist in describing the embodiments and are not intended to limit the claims in any way. Such terms, do not require exactness (e.g., exact perpendicularity or exact parallelism, etc.), but instead it is intended that normal tolerances and ranges apply. Similarly, unless explicitly stated otherwise, each numerical value and range should be interpreted as being approximate as if the word "about", "substantially" or "approximately" preceded the value of the value or range.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. Signals and corresponding nodes or ports may be referred to by the same name and are interchangeable for purposes here.

As used herein in reference to an element and a standard, the term "compatible" means that the element communicates with other elements in a manner wholly or partially specified by the standard, and would be recognized by other elements as sufficiently capable of communicating with the other elements in the manner specified by the standard. The compatible element does not need to operate internally in a manner specified by the standard.

It will be further understood that various changes in the details, materials, and arrangements of the parts that have been described and illustrated herein might be made by those skilled in the art without departing from the scope of the following claims.

The invention claimed is:

1. A system for controlling a synchronization object of a computer processing system comprising:
one or more processors programmed and configured to cause the execution of:
one or more processing threads;
a background thread configured to manage a processing flow of the one or more processing threads, the background thread configured to process one or more predetermined abort points for the one or more processing threads, the one or more abort points configured to direct any one of the one or more processing threads to execute exit processing code when an abort indicator signals that the one or more processing threads should be aborted; and
a synchronization object for synchronizing the processing of the one or more processing threads, the synchronization object comprising a waiting queue for processing requests made by the one or more processing threads, the synchronization object programmed and configured to: upon receiving a processing request from any one of the one or more processing threads, queue the processing thread from which the request is received in the waiting queue until the processing request can be processed, wherein the synchronization object releases any of the one or more processing threads that are in the waiting queue in response to a request that the one or more processing threads should be aborted.

2. The system of claim 1 wherein releasing processing threads comprises calling a cancel waiting function that releases any of the one or more processing threads that are in the waiting queue.

3. The system of claim 2 wherein the synchronization object is further configured to: upon receiving a subsequent processing request from any one of the one or more processing threads, return a signal indicating the subsequent processing request was aborted and not processed.

4. The system of claim 3 wherein the synchronization object comprises an API, the API comprising at least one function for processing threads to make processing requests of the synchronization object, the at least one function configured to:
while the abort indicator is not signaled, not return until the processing request is processed or the cancel waiting function is processed; and,
if the abort indicator is signaled, return a signal indicating the request was aborted without processing the request.

5. The system of claim 4 wherein if the synchronization object is busy processing requests, queuing additional requesting processing threads in the waiting queue until the synchronization object is available to process the additional requests or until the cancel waiting function is called.

6. The system of claim 1 wherein the synchronization object is a semaphore object representing a system resource.

7. The system of claim 6 wherein the system resource is a memory object.

8. The system of claim 7 wherein the system resource is at least one of a volatile memory, non-volatile memory, or a memory pool.

9. A method for controlling a synchronization object of a computer processing system comprising:
executing one or more processing threads;
executing a background thread configured to manage a processing flow of the one or more processing threads, the background thread configured to process one or more predetermined abort points for the one or more processing threads, the one or more abort points configured to direct any one of the one or more processing threads to execute exit processing code when an abort indicator signals that the one or more processing threads should be aborted; and
executing a synchronization object for synchronizing the processing of the one or more processing threads, the synchronization object comprising a waiting queue for processing requests made by the one or more processing threads, the synchronization object programmed and configured to: upon receiving a processing request from any one of the one or more processing threads, queue the processing thread from which the request is received in the waiting queue until the processing request can be processed, wherein the synchronization object releases any of the one or more processing threads that are in the waiting queue in response to a request that the one or more processing threads should be aborted.

10. The method of claim 9 wherein releasing processing threads comprises calling a cancel waiting function that releases any of the one or more processing threads that are in the waiting queue.

11. The method of claim 10 wherein the synchronization object is further configured to:
   upon receiving a subsequent processing request from any one of the one or more processing threads, return a signal indicating the subsequent processing request was aborted and not processed.

12. The method of claim 11 wherein the synchronization object comprises an API, the API comprising at least one function for processing threads to make processing requests of the synchronization object, the at least one function configured to:
   while the abort indicator is not signaled, not return until the processing request is processed or the cancel waiting function is processed; and,
   if the abort indicator is signaled, return a signal indicating the request was aborted without processing the request.

13. The method of claim 12 wherein if the synchronization object is busy processing requests, queuing additional requesting processing threads in the waiting queue until the synchronization object is available to process the additional requests or until the cancel waiting function is called.

14. The method of claim 9 wherein the synchronization object is a semaphore object representing a system resource.

15. The method of claim 14 wherein the system resource is at least one of volatile or non-volatile memory.

16. The method of claim 14 wherein the system resource comprises a network communications device.

17. A computer program product for sharing computing resources, the computer program product comprising a non-transitory computer-readable storage medium encoded with computer-executable program code programmed to cause the execution across one or more processors of:
   executing one or more processing threads;
   executing a background thread configured to manage a processing flow of the one or more processing threads, the background thread configured to process one or more predetermined abort points for the one or more processing threads, the one or more abort points configured to direct any of the one or more processing threads to execute exit processing code when an abort indicator signals that the one or more processing threads should be aborted; and
   executing a synchronization object for synchronizing the processing of the one or more processing threads, the synchronization object comprising a waiting queue for processing requests made by the one or more processing threads, the synchronization object programmed and configured to: upon receiving a processing request from any of the one or more processing threads, queue the processing thread from which the request is received in the waiting queue until the processing request can be processed, wherein the synchronization object releases any of the one or more processing threads that are in the waiting queue in response to a request that the one or more processing threads should be aborted.

18. The computer program product of claim 17 wherein releasing processing threads comprises calling a cancel waiting function that releases any of the processing threads that are in the waiting queue.

19. The computer program product of claim 18 wherein the synchronization object, upon receiving a subsequent processing request from any one of the one or more processing threads, returns a signal indicating the subsequent request was aborted and not processed.

20. The computer program product of claim 19 wherein the synchronization object comprises an API, the API comprising at least one function for processing threads to make processing requests of the synchronization object, the at least one function configured to:
   while the abort indicator is not signaled, not return until the processing request is processed or the cancel waiting function is processed; and,
   if the abort indicator is signaled, return a signal indicating the request was aborted without processing the request.

* * * * *